June 8, 1965 R. E. ARMSTRONG 3,188,190
METHOD FOR FIRE POLISHING
Original Filed Nov. 15, 1957 2 Sheets-Sheet 2
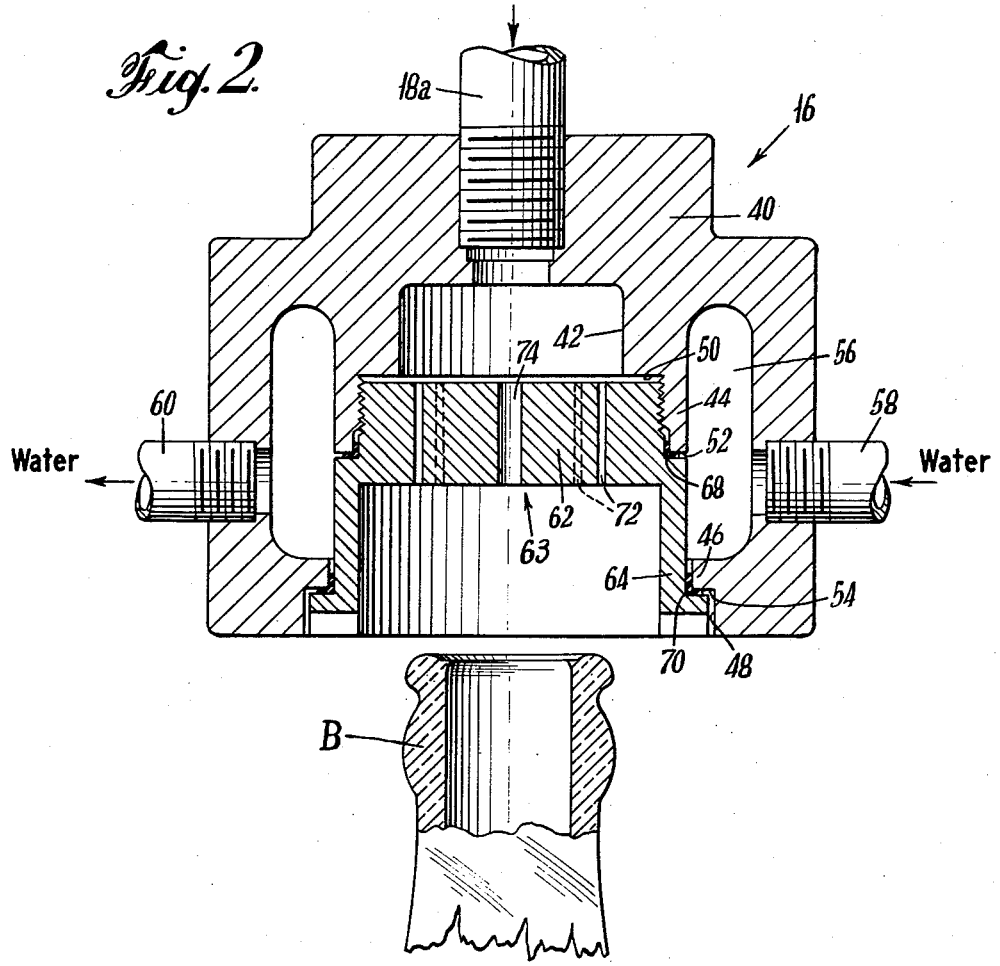
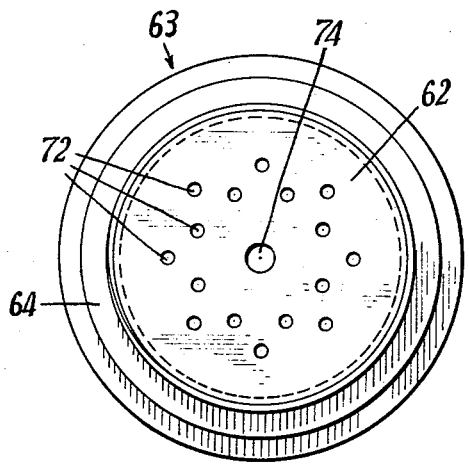
INVENTOR.
RAYMOND E. ARMSTRONG
BY *Herbert J. Evers*
ATTORNEY United States Patent Office 3,188,190
Patented June 8, 1965

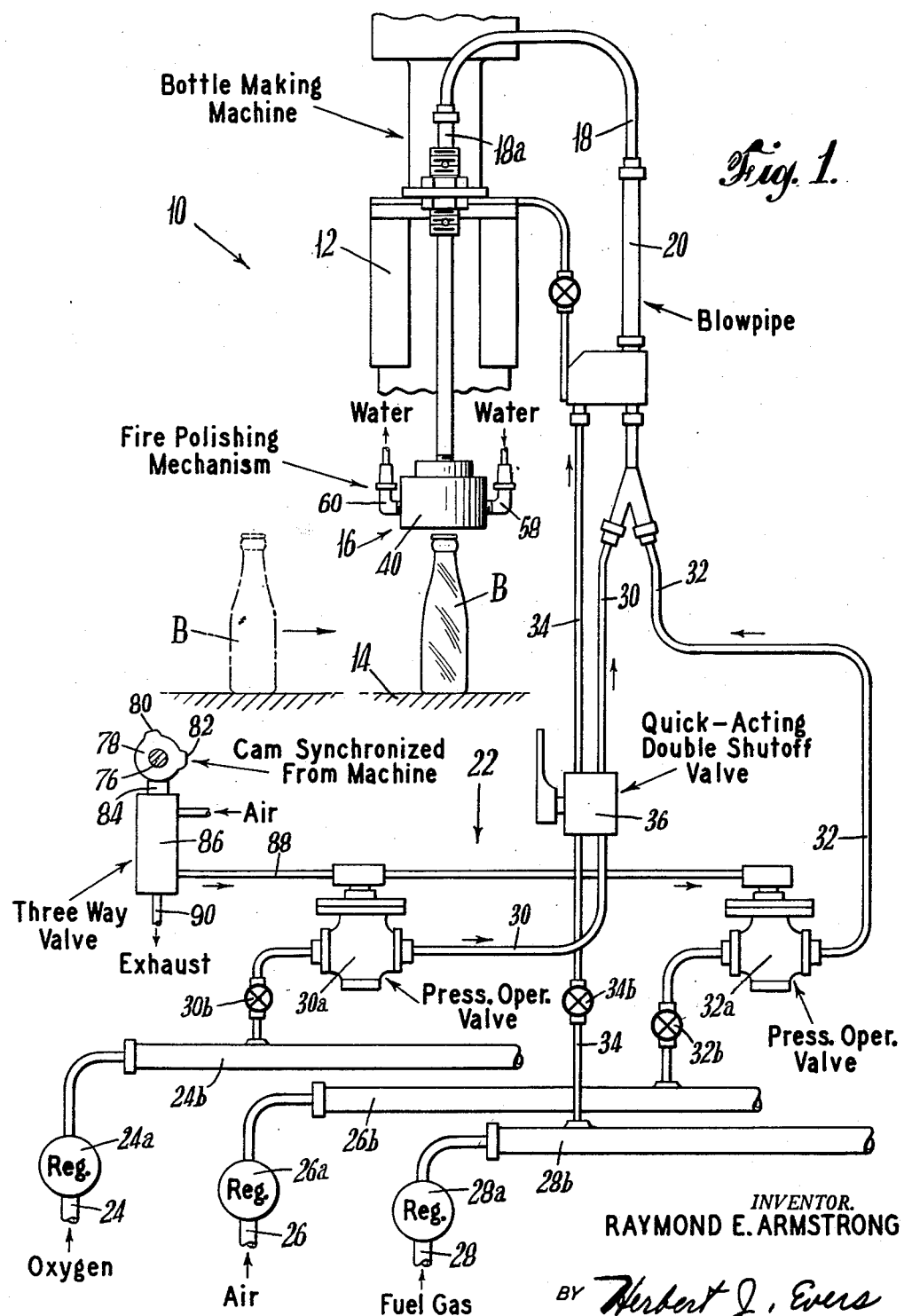

3,188,190
METHOD FOR FIRE POLISHING
Raymond E. Armstrong, Clark Township, N.J., assignor to Union Carbide Corporation, a corporation of New York
Original application Nov. 15, 1957, Ser. No. 696,767. Divided and this application Oct. 31, 1961, Ser. No. 151,591
6 Claims. (Cl. 65—104)

This invention relates to heating of glass articles and more particularly concerns a novel method for the fire polishing of glassware.

In the manufacture of glass articles, for example, beverage bottles, several problems are to be considered in the glass working operation. One of the important problems involves the removal of irregularities from the surface of the glass article to strengthen and improve the sealing surfaces thereof. These surface irregularities, usually referred to as "checks," "pits," or "mold marks," are caused by carbon build up, wear and unequal expansion of the mold halves used in forming the article. The conventional method of removing mold marks involves progressively heating the article as uniformly as possible around the irregular surfaces with an air-fuel gas or oxygen-fuel gas fire-polishing flame. Because the amount of heat varies with the size of the mold mark, this method may, in some instances where the irregularities are large, result in distortion of the glass container.

Another problem concerns the cost of fire-polishing these surface irregularities. To illustrate, assume a glass manufacturing machine produces approximately three times as many 12-ounce bottles as it does quart bottles (32 ounces). With progressive fire-polishing where the fire polishing head is constantly burning an air-fuel gas mixture, the cost of polishing quart bottles is three times that of 12-ounce bottles. In addition, much of the fire polishing flame is wasted during the time a glass article is removed from the fire-polishing station and another glass article is moved into the station.

Yet another problem involves the large volume of air-fuel gas required for fire-polishing, which often causes the hot glass container to blow up or distort. This is to be distinguished from a fire polishing operation using an oxygen-fuel gas mixture, which uses a greatly reduced volume of gas.

In order to produce glass articles of better quality at less cost, it is necessary that these problems be substantially reduced or eliminated. To the end that the above set-forth difficulties may be avoided, the present invention provides an improved fire-polishing process therefor, wherein the conventional air-fuel gas burner mixture is replaced with an intermittently operated oxygen-fuel gas flame to deliver greater amounts of heat at fire-polishing temperatures, and wherein the intermittent delivery of concentrated heat is synchronized to operate only when a glass container is in fire-polishing position in the machine.

It is, therefore, an important object of the present invention to provide an improved fire-polishing process for glass containers for intermittently delivering and applying a highly efficient, high temperature, fire-polishing flame in order to smooth the rough edges or to remove surface blemishes.

Another object of the present invention is to provide a method of fire-polishing glass containers which is simpler and less expensive to operate than the conventional air-fuel gas, progressively burning fire-polishing method.

Other objects, features, and advantages of the present invention will be apparent from the following detailed description of certain embodiments thereof taken in conjunction with the following detailed drawings in which:

FIG. 1 is a flow diagram of a fire-polishing unit for carrying out the principles and features of the present invention.

FIG. 2 is an enlarged elevational view in section of the polishing head part of the unit shown in FIG. 1.

FIG. 3 is a top view of the burner element in the fire-polishing head shown in FIG. 2.

According to the present invention, process steps are provided for efficiently utilizing and controlling the polishing flame of a fire-polishing unit to the extent that suitable high intensity and high temperature polishing flames may be intermittently developed only when necessary, the high intensity polishing flame being automatically adjustably controlled in accordance with the movement of the glass article to be treated from one processing station to another. As a step for accomplishing this, the fire-polishing head is supplied with a stream of air and fuel gas, such as propane. Oxygen gas periodically replaces the air in the gas mixture to increase the intensity or temperature of the fire-polishing flame.

It is to be understood that this invention is not limited to the above tested materials, and that the choice of gas and the article being treated depends on the desired operating conditions. For illustrative purposes, however, the invention will be described in connection with the fire-polishing of glass articles, such as beverage bottles, using a gas mixture of air and propane fuel gas and intermittently supplanting the air with oxygen.

Shown in FIG. 1 is a fire-polishing unit 10 embodying the principles and features of the present invention and comprising a frame 12 provided with a base or table 14 and having a fire-polishing head 16 securely mounted on the frame 12 and spaced above the table 14. The polishing-head 16 is operatively connected through a flexible hose or pipe 18 and a connecting tube or adaptor 18a to a blowpipe 20 which is supplied with a gas mixture through a control mechanism 22.

The control mechanism 22 consists of a plurality of gas distribution pipes 24, 26, 28 connected to a suitable source of supply (not shown) and extending into individual gas regulator valves 24a, 26a, 28a, respectively. The regulators 24a, 26a, 28a are piped to manifolds 24b, 26b, 28b, which convey the gas to lines 30, 32, 34 respectively to the blowpipe 20.

In the embodiment of the invention illustrated in FIG. 1, the gas lines 30, 32 and 34 are supplied wtih oxygen air, and fuel gas respectively. The oxygen and air line 30 and 32, have interposed therein pressure operated valves 30a and 32a respectively, to be described hereinafter as well as series connected control and shut-off valves 30b and 32b. A control and shut off valve 34b is also provided in fuel line 34. The regulators 24a, 26a, 28a may be selectively adjusted to control the flame intensity at the fire-polishing head 16. To turn off the machine, a master valve or quick acting, double shut-off valve 36 is operatively connected in lines 30 and 34.

In accordance with the invention, means are provided for substantially improving the removal of surface irregularities and other blemishes in glass containers. To this end, the polishing head 16 is provided with a cup-shaped housing 40 cast made of bronze or other non-corrodable metal of substantially cylindrical form.

The housing 40 shown in FIG. 2 comprises a central gas mixture space or chamber having a cylindrical wall 42, a flame head space having a cylindrical wall 44 which is internally threaded at its innermost end, a burner body space having a cylindrical wall 46, and a cylindrical burner flange space having a wall 48, which are stepped from each other to define respectively shoulders 50, 52, and 54. A recess in the wall 46 defines an annular passage 56 in the housing 40 which is in spaced concentric relation to the housing walls 42 and 44 and provides means for the circulation of cooling water. Threaded, water-tight inlet and outlet connections 58, 60, in the cylindrical outer wall of the housing 40 afford means for introducing and removing cooling water from the cooling space 56. A gas-tight threaded connection in the upper outer wall of the housing 40 provides the necessary communication between the adaptor 18a and the gas mixture chamber defined by wall 42.

Referring to FIG. 2, secured within the housing 40 by means of the internally threaded wall 44 is a substantially cylindrical burner element 63 comprising a threaded plate or head 62 having an integrally formed skirt or cylindrical wall 64 which acts as a flame retentive means and to confine the flame heat to the fire-polishing area. The skirt 64 is conformably stepped to firmly hold gaskets 68, 70 against shoulders 52, 54 for the prevention of leakage of gas or cooling water between the burner 63 and the burner housing 40. In assembly with housing 40, the cylindrical wall 64 of the burner forms the closure wall for the cooling space 56.

As shown in FIG. 3, the burner plate 62 is provided with plurality of orifices or apertures 72 which extend longitudinally therethrough, although suitable slotted openings may be employed if so desired. The apertures 72 which serve as flame ports for the burner element 63, may be suitably arranged in a circular or annular pattern, a double row with the apertures in one row staggered from the apertures in the other row being illustrated in FIG. 3.

As a feature of the invention, spot heating of the top of the beverage bottle B is prevented by providing the orificed plate 62 with a center orifice 74 having a diameter approximately three times the diameter of the flame ports 72. The flame leaving the orifice 74 strikes the air in the bottle B and fire polishes the mold marks inside the bottle as well as the upper surface of the bottle lip. Thus, the major portion of the flame serves to fire polish the major portion of the glass to be heated.

In the present invention, an intermittent flow of oxygen and fuel gas mixture will produce a better quality ware than fire-polishing apparatus using a continuous air-fuel gas flame.

Coordination of the intermittent flow of the oxygen-fuel gas mixture through the burner 63 with the correct positioning of the beverage bottle B in the fire-polishing station is accomplished as follows: A drive shaft 76, suitably powered and adapted to rotate in synchronization with the movement of the table 14 or by some other equally suitable timing mechanism (not shown) is provided with a cam 78 having projections 80, 82 for actuating the plunger 84 of a three-way valve 86. The valve 86, through air line 88, is pneumatically connected to pressure operated valves 30a and 32a.

In accordance with my invention, the burner 63 is normally supplied with air and fuel to produce a flame in one temperature range. The turning of drive shaft 76 is properly timed so that at the exact moment the bottle is suitably positioned in the flame-polishing station as indicated by the solidly outlined bottle B in FIG. 1, the cam projection 80 is in registry with the plunger 84, to admit high pressure air in line 88, thereby closing the air pressure valve 32a, and actuating the oxygen pressure valve 30a into open position, and producing a fire-polishing flame in a higher and more efficient temperature range. Afteer the bottle B has completed its dwell period in the fire-polishing station, usually about 1 to 2 seconds, the bottle B is suitably moved out of the fire-polishing station and the cam projection 82 simultaneously depresses the plunger 84 to allow the air in the air line 88 to leave through exhaust air line 90, thereby restoring the flow of air through air pressure valve 32a and shutting oxygen pressure valve 30a.

From the above description it will be seen that the present invention provides a novel fire-polishing method and an improved fire-polishing apparatus therefor having means for at least intermittently delivering a flow of oxygen-fuel gas to the flame plate or at least intermittently interrupting the flow of oxygen-fuel gas with either an air-fuel gas mixture or a purge gas such as air. In any case, a highly efficient oxygen-fuel gas flame is formed during the period a glass article is under the flame in proper position to be fire-polished.

It is to be understood that the invention is not intended to be limited to the embodiment shown herein, but that flame heads of other configurations and having other flame port arrangements may be employed in the practice of the invention. While the invention has been described in connection with a stationary flame head, the invention is susceptible of use with either stationary or relatively movable burner heads, for example rotary or oscillatory burner heads, without departing from the spirit and scope of the invention.

This application is a division of my copending application Serial No. 696,767, filed November 15, 1957, now abandoned.

What is claimed is:

1. Method for fire polishing a glass article comprising presenting for fire polishing the article for fire polishing to an air-fuel gas flame mixture, and replacing said mixture with an oxygen-fuel gas flame mixture of greater intensity during the period the article is in fire-polishing position.

2. Method for fire polishing a glass article comprising presenting for fire polishing the article to an air-fuel gas flame mixture, and intermittently supplanting the air in said mixture with oxygen in synchronization with the dwell period of the article in fire-polishing position.

3. Process of fire polishing the upstanding circular rim of a glass container, which comprises feeding the container into register under a fire-polishing head, supplying fuel gas and air to said head to produce a flame in one temperature range, maintaining said container in register with said head for a predetermined dwell, discontinuing the supply of air and initiating a flow of oxygen to said head simultaneously as said container comes into register therewith to produce fire polishing flame in a higher and more efficient temperature range, directing said flame down toward said rim continuously for the duration of such dwell, discontinuing the flow of oxygen at the conclusion of such dwell, and thereafter removing the fire-polished container from register with said head.

4. Process of fire polishing the upstanding circular rim of a glass container, which comprises feeding the container into register under a fire-polishing head, supplying fuel gas and air to said head to produce a flame in one temperature range, maintaining said container in register with said head for a predetermined dwell, discontinuing the supply of air and initiating a flow of oxygen to said head simultaneously as said container comes into register therewith to produce fire polishing flame in a higher and more efficient temperature range, directing said flame down concentric with said upstanding rim, confining the outside of said flame to retain the heat in the fire polishing area, maintaining said flame continuous for the duration of such dwell, discontinuing the flow of oxygen at the conclusion of such dwell, and thereafter removing the fire polished container from register with said head.

5. Process of fire polishing the upstanding circular rim of a glass container, which comprises feeding the container into register under a fire-polishing head supplying fuel gas and air to said head to produce a flame in one temperature range, maintaining said container in register with said head for a predetermined dwell, discontinuing the supply of air and initiating a flow of oxygen and fuel gas to said head simultaneously as said container comes into register therewith, directing said flow down around said upstanding rim to form a ring of flames in a higher and more efficient temperature range, confining the outside of said ring of flames to retain the heat in the fire-polishing area, maintaining said container in register with said head and continuing said flow and ring of flames for a fire-polishing dwell, discontinuing the flow of said oxygen at the conclusion of such dwell, and thereafter removing the fire-polished container from register with said head.

6. Process of fire polishing the upstanding circular rim of a glass container, which comprises feeding the container into register under fire polishing head normally supplied with air and fuel to produce a flame in one temperature range, discontinuing the supply of air and initiating a flow of oxygen to said head simultaneously as said container comes into register therewith to produce a fire-polishing flame in a higher and more efficient temperature range, maintaining said container in such register for a predetermined dwell, directing a concentric ring of said fire-polishing flame down against said upstanding circular rim continuously for the duration of such dwell, discontinuing the flow of oxygen at the conclusion of such dwell, and thereafter removing the fire-polished container from register with said head.

References Cited by the Examiner
UNITED STATES PATENTS

| 962,861 | 6/10 | Sanford | 65—284 |
| 1,626,739 | 5/27 | Lents et al. | 65—120 |
| 2,938,577 | 5/60 | Hughey | 158—27.4 |

DONALL H. SYLVESTER, *Primary Examiner.*